(12) United States Patent
Hsu et al.

(10) Patent No.: US 9,628,610 B2
(45) Date of Patent: Apr. 18, 2017

(54) NETWORK STRUCTURE AND CENTRAL OFFICE EQUIPMENT (COE) AND CUSTOMER PREMISES EQUIPMENT (CPE) THEREOF

(71) Applicant: ASKEY COMPUTER CORP., New Taipei (TW)

(72) Inventors: Ming-Hsien Hsu, Taoyuan County (TW); Cheng-Yi Liao, Hsinchu County (TW); Ching-Wei Tang, Taoyuan County (TW)

(73) Assignee: ASKEY COMPUTER CORP., New Taipei (TW)

( * ) Notice: Subject to any disclaimer, the term of this patent is extended or adjusted under 35 U.S.C. 154(b) by 289 days.

(21) Appl. No.: 14/497,291

(22) Filed: Sep. 25, 2014

(65) Prior Publication Data
US 2015/0195413 A1    Jul. 9, 2015

(30) Foreign Application Priority Data
Jan. 3, 2014  (TW) .............................. 103100211 A

(51) Int. Cl.
| | |
|---|---|
| *H04M 3/02* | (2006.01) |
| *H04M 7/00* | (2006.01) |
| *H04M 3/00* | (2006.01) |
| *H04B 3/50* | (2006.01) |

(52) U.S. Cl.
CPC .............. *H04M 3/007* (2013.01); *H04B 3/50* (2013.01)

(58) Field of Classification Search
CPC  H04B 3/50; H04B 3/54; H04B 3/542; H04M 3/007; H04M 3/02; H04M 7/0024
USPC .......................................... 379/322, 323, 324
See application file for complete search history.

(56) References Cited

U.S. PATENT DOCUMENTS

| | | | | |
|---|---|---|---|---|
| 8,601,289 | B1* | 12/2013 | Smith ...................... | H04L 12/10 713/300 |
| 8,818,192 | B1* | 8/2014 | Smith ................... | H04B 10/808 398/171 |
| 2013/0163732 | A1* | 6/2013 | Humphrey .......... | H04L 12/2898 379/93.07 |
| 2013/0251114 | A1* | 9/2013 | Humphrey ............ | H04M 1/738 379/30 |

FOREIGN PATENT DOCUMENTS

| | | |
|---|---|---|
| CN | 2540713 | 3/2003 |
| CN | 1509019 | 6/2004 |
| CN | 200983281 | 11/2007 |
| CN | 201004689 | 1/2008 |

OTHER PUBLICATIONS

"Office Action of China Counterpart Application", issued on Jan. 16, 2017, p. 1-p. 4, in which the listed references were cited.

* cited by examiner

*Primary Examiner* — Harry S Hong
(74) *Attorney, Agent, or Firm* — Jianq Chyun IP Office

(57) ABSTRACT

A network structure including a central office equipment (COE) and a customer premises equipment (CPE) is provided. The CPE is connected to the COE through a single twisted-pair cable, and configured to convert an external power and supply power to the COE through the single twisted-pair cable. In addition, the data transmission and the transmission of telephone voice are performed between the COE and the CPE through the single twisted-pair cable.

15 Claims, 2 Drawing Sheets

NETWORK STRUCTURE AND CENTRAL OFFICE EQUIPMENT (COE) AND CUSTOMER PREMISES EQUIPMENT (CPE) THEREOF

CROSS-REFERENCE TO RELATED APPLICATION

This application claims the priority benefit of Taiwan application serial no. 103100211, filed on Jan. 3, 2014. The entirety of the above-mentioned patent application is hereby incorporated by reference herein and made a part of this specification.

BACKGROUND

Technical Field

The invention relates to a network communication technique. Particularly, the invention relates to a network structure based on a digital subscriber loop (xDSL) and a public switched telephone network (PSTN) and central office equipment (COE) and customer premises equipment (CPE) thereof.

Related Art

If data transmission, transmission of telephone voice and reverse power supply are simultaneously performed between central office equipment (COE) and customer premises equipment (CPE) of a digital subscriber loop (xDSL), two twisted-pair cables have to be established, where one of the twisted-pair cables is in charge of the data transmission and the transmission of telephone voice, and another one of the twisted-pair cables is in charge of independently supplying power (for example, supplying power from the CPE to the COE).

Alternatively, one twisted-pair cable is in charge of data transmission and reverse power supply, and the other twisted-pair cable is in charge of transmitting telephone voice.

Since the COE provides a forward power for transmitting telephone voice, when the reverse power supply is supplied, power supply confliction is generated, and transmission of telephone voice and the reverse power supply cannot coexist on the same twisted-pair cable. Therefore, when the related equipment is established, a twisted-pair cable has to be additionally added to avoid coexistence of the transmission of telephone voice and the reverse power supply on the same twisted-pair cable, so as to achieve an effect of simultaneously implementing data transmission, transmission of telephone voice and reverse power supply. Since the existing solution is to additionally add one twisted-pair cable, besides that the existing network lines have to be adjusted, implementation cost is also increased. Due to aging of the twisted-pair cables, a whole maintenance cost is increased.

SUMMARY

The invention provides a network structure based on a digital subscriber loop (xDSL) and a public switched telephone network (PSTN) and central office equipment (COE) and customer premises equipment (CPE) thereof. Moreover, only a single twisted-pair cable is required to be established between the COE and the CPE of the xDSL to simultaneously implement data transmission, transmission of telephone voice and power supply. In this way, the problem of the related art is overcome/resolved.

Other objects and advantages of the invention can be further illustrated by the technical features broadly embodied and described as follows.

An exemplary embodiment of the invention provides a network structure including central office equipment (COE) and customer premises equipment (CPE). The CPE is connected to the COE through a single twisted-pair cable, and is configured to convert an external power and supply power to the COE through the single twisted-pair cable. In addition, data transmission and transmission of telephone voice are performed between the COE and the CPE through the single twisted-pair cable.

In an exemplary embodiment of the invention, the COE includes a CO modem, a CO voice gateway and a power extraction device. The CO modem is connected to a network provider through a network cable. The CO voice gateway is connected to the CO modem, and is connected to a public switched telephone network (PSTN) through a CO cable. The CO voice gateway is capable of blocking a plurality of electrical signals come from the PSTN. The power extraction device is coupled to the CO modem, the CO voice gateway and one terminal of the single twisted-pair cable, and is configured to receive and extract the power supplied by the CPE through the single twisted-pair cable and provide the power to the CO modem and the CO voice gateway for usage.

In an exemplary embodiment of the invention, the CPE includes a CP modem, a power supply device, and a CP voice gateway. The CP modem is connected to a CP computer through a network cable, and is operated under the external power. The power supply device is coupled to the CP modem and another terminal of the single twisted-pair cable, and is configured to receive the external power, and convert the received external power for supplying power to the power extraction device of the COE through the single twisted-pair cable. The CP voice gateway is connected to the CP modem, and is connected to a CP telephone through a telephone line. The CP voice gateway is operated under the external power, and is capable of regenerating the electrical signals in response to a ringing signal come from the PSTN or off-hook of the CP telephone.

In an exemplary embodiment of the invention, the electrical signals include a polarity reversal, a voltage variation of the ringing signal, and a loop current required for off-hooking the CP telephone.

In an exemplary embodiment of the invention, the power supply device and the CP voice gateway are a modularized device to serve as an external module of the CP modem.

In an exemplary embodiment of the invention, the CP voice gateway is operated under the external power, and continually supplies power required by the CP telephone.

In an exemplary embodiment of the invention, when data transmission is performed between the COE and the CPE, the data transmission is performed between the CO modem and the CP modem through the power extraction device, the single twisted-pair cable and the power supply device. Moreover, the transmission of telephone voice is performed between the CO voice gateway and the CP voice gateway through the CO modem, the power extraction device, the single twisted-pair cable, the power supply device and the CP modem in response to off-hook of the CP telephone, or the transmission of telephone voice is stopped in response to on-hook of the CP telephone.

Another exemplary embodiment of the invention independently provides the aforementioned COE.

Another exemplary embodiment of the invention independently provides the aforementioned CPE.

According to the above descriptions, the network structure of the invention is based on the xDSL and the PSTN, and only a single twisted-pair cable is required to be established between the COE and the CPE thereof to simultaneously implement data transmission, transmission of telephone voice and power supply (since the CO voice gateway has a characteristic of blocking the electrical signals, and the CP voice gateway has a characteristic of regenerating the blocked electrical signals). In this way, the data transmission, the transmission of telephone voice and the (reverse/inverse) power supply between the COE and the CPE have no interference there between, so as to overcome/resolve the problem mentioned in the related art.

In order to make the aforementioned and other features and advantages of the invention comprehensible, several exemplary embodiments accompanied with figures are described in detail below.

However, it should be noticed that the aforementioned descriptions and the following embodiments are only exemplary and interpretive, and are not used to limit the claims of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
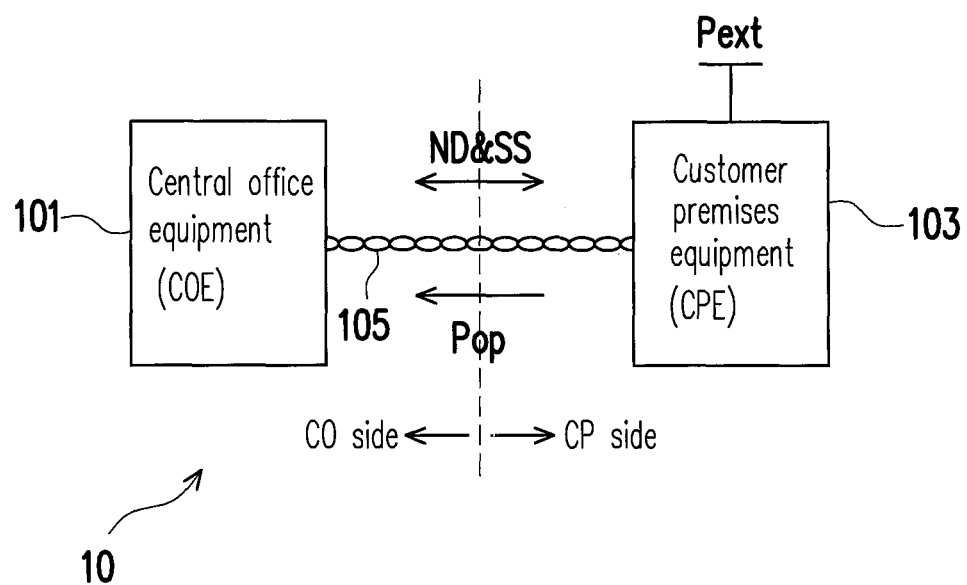
FIG. 1 is a schematic diagram of a network structure according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
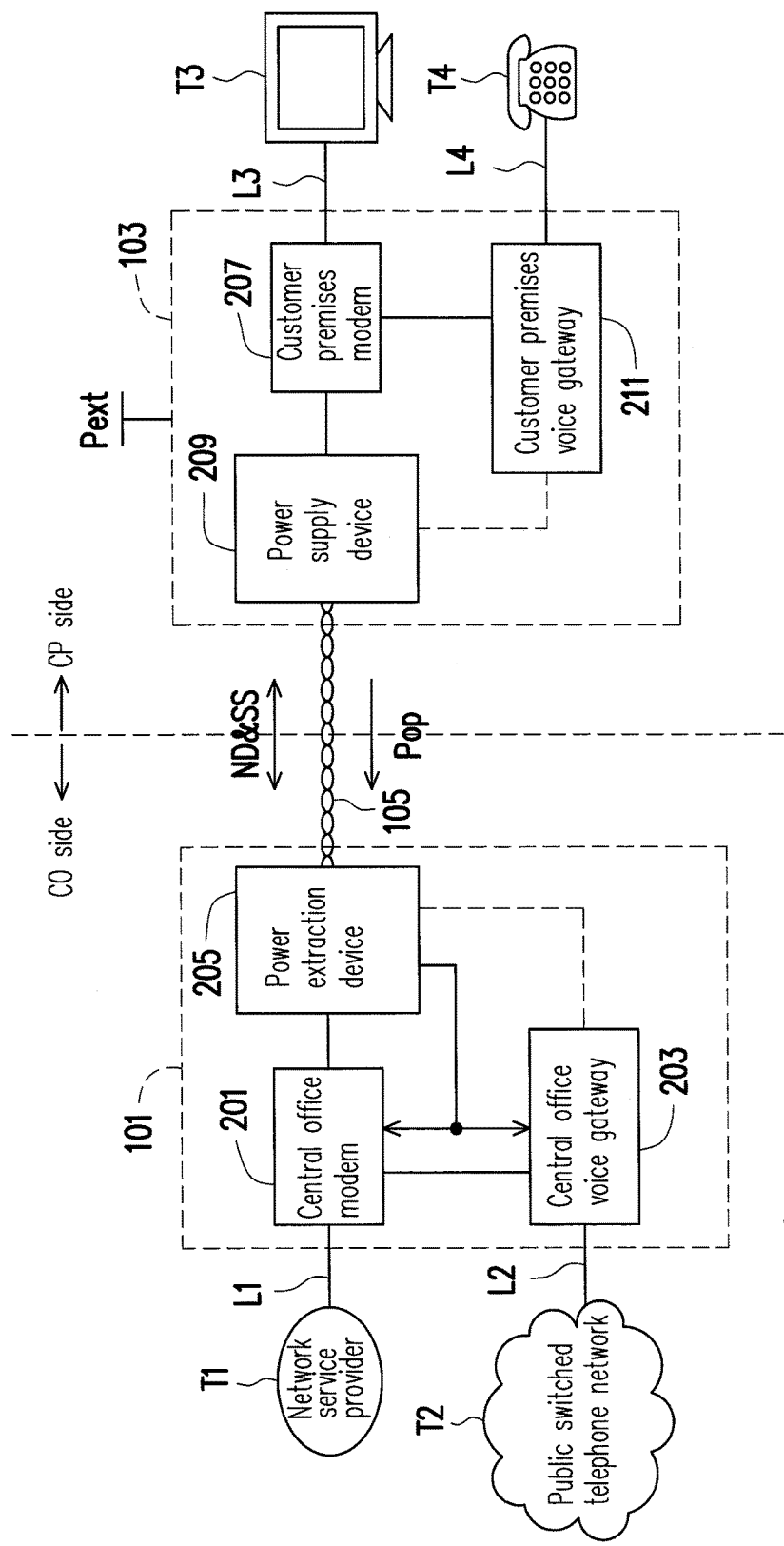
FIG. 2 is a schematic diagram illustrating an implementation of the network structure of FIG. 1.

FIG. 1 is a schematic diagram of a network structure 10 according to an exemplary embodiment of the invention. FIG. 2 is a schematic diagram illustrating an implementation of the network structure 10 of FIG. 1. Referring to FIG. 1 and FIG. 2, the network structure 10 is based on a digital subscriber loop (xDSL) and a public switched telephone network (PSTN) of a fiber to the distribution point (FTTdp) structure, though the invention is not limited thereto. Moreover, the network structure 10 may include a central office equipment (COE) 101 and a customer premises equipment (CPE) 103.

In the present exemplary embodiment, the CPE 103 can be connected to the COE 101 through a single twisted-pair cable 105. Moreover, the CPE 103 can perform a conversion (for example, direct current (DC)-to-DC conversion, though the invention is not limited thereto) on a received external power Pext, and reversely supplies a power Pop (for example, −48V, though the invention is not limited thereto) required by the COE 101 through the single twisted-pair cable 105. Moreover, the COE 101 and the CPE 103 can further perform data transmission ND and transmission of telephone voice SS there between through the single twisted-pair cable 105.

More specifically, the COE 101 may include a CO modem (for example, ATU-C, VTU-C, SHTU-C, xTU-C, etc.) 201, a CO voice gateway (i.e. FXO gateway) 203 and a power extraction device 205. The CO modem (hereinafter "xTU-C") 201 can be connected to a network service provider T1 (for example, Chunghwa telecom, or other telecom practitioners) through a network cable L1 (for example, a fiber cable, though the invention is not limited thereto).

The CO voice gateway (hereinafter "FXO gateway") 203 is connected to the xTU-C 201, and is connected to the public switched telephone network (PSTN) T2 through a CO cable L2. Moreover, the FXO gateway 203 further at least has a function of or is capable of blocking a plurality of electrical signals (which are described later) come from the PSTN T2 from transmitting to the single twisted-pair cable 105. The FXO gateway 203 converts the telephone voice and signals into a digital form, and performs data transmission through the xTU-C and a CP modem (xTU-R).

The power extraction device 205 is coupled to the xTU-C 201, the FXO gateway 203 and one terminal of the single twisted-pair cable 105. The power extraction device 205 is configured to receive and extract the power Pop (i.e. the reverse/inverse power) supplied by the CPE 103 through the single twisted-pair cable 105 and provide the same to the xTU-C 201 and the FXO gateway 203 for usage. In other words, the power of the COE 101 is supplied by the CPE 103, so that the COE 101 is unnecessary to additionally connect a power supply.

On the other hand, the CPE 103 may include a CP modem (for example, ATU-R, VTU-R, SHTU-R, xTU-R, etc.) 207, a power supply device 209 and a CP voice gateway (i.e. FXS gateway) 211. The CP modem (hereinafter "xTU-R") 207 is connected to a CP computer T3 through a network cable L3, and is operated under the external power Pext.

The power supply device 209 is coupled to the xTU-R 207 and another terminal of the single twisted-pair cable 105. The power supply device 209 is configured to receive the external power Pext and perform a conversion (for example, a DC-to-DC conversion) on the received external power Pext, and supplies the power Pop to the power extraction device 205 of the COE 101 through the single twisted-pair cable 105.

The CP voice gateway (hereinafter "FXS gateway") 211 is connected to the xTU-R 207, and is connected to a CP telephone T4 through a telephone line L4. The FXS gateway 211 is operated under the external power Pext, and at least has a function of or is capable of regenerating the electrical signals blocked by the FXO gateway 203 in response to a ringing signal come from the PSTN T2 or off-hook of the CP telephone T4.

For example, the FXS gateway 211 may regenerate polarity reversal, a voltage variation of the ringing signal and a loop current required for off-hooking the CP telephone T4 come from a tip/ring of the CO side in response to the ringing signal come from the PSTN T2 or off-hook of the CP telephone T4, though the invention is not limited thereto. Even, the FXS gateway 211 is operated under the external power Pext to continually supply power required by the CP telephone T4.

In the present embodiment, in response to dialling of a remote/external telephone (not shown) connected to the PSTN T2, the FXO gateway 203, for example, blocks a ringing voltage come from the PSTN T2 through an analog-to-analog mechanism (e.g. DAA), and accordingly generates a ringing message of a digital form and transmits the same to the FXS gateway 211 through the xTU-C 201, the power extraction device 205, the single twisted-pair cable 105, the power supply device 209 and the xTU-R 207, such that the FXS gateway 211 learns that an external telephone calls to the CP telephone T4.

Then, the FXS gateway 211 regenerates the ringing signal of an analog form in response to the transmitted ringing message of the digital form, and the CP telephone T4 rings in response to the ringing signal.

Thereafter, in response to the off-hook of CP telephone T4, the FXS gateway 211 generates an off-hook message of the digital form and transmits the same to the FXO gateway 203 through the xTU-R 207, the power supply device 209, the single twisted-pair cable 105, the power extraction device 205 and the xTU-C 201, such that the FXO gateway 203 learns that the CP telephone T4 is off-hook and is connected to the remote/external telephone of the PSTN T2 to transmit the telephone voice SS to each other.

In this way, when the COE 101 and the CPE 103 satisfy a data transmission condition based on a network connection (i.e. the network connection is established between the COE 101 and the CPE 103 after dialling), the data transmission ND can be performed between the xTU-C 201 and the xTU-R 207 through the power extraction device 205, the single twisted-pair cable 105 and the power supply device 209. Moreover, transmission of the telephone voice SS can be performed between the FXO gateway 203 and the FXS gateway 211 through the xTU-C 201, the power extraction device 205, the single twisted-pair cable 105, the power supply device 209 and the xTU-R 207 in response to the off-hook of the CP telephone T4, such that a phone call can be performed between the CP telephone T4 and the remote/external telephone connected to the PSTN T2.

During a period that the phone call is performed between the CP telephone T4 and the remote/external telephone connected to the PSTN T2, i.e. in response to the off-hook of the CP telephone T4, the FXO gateway 203 further blocks a loop current required for off-hooking the CP telephone T4, meanwhile, the FXS gateway 211 regenerates the loop current required for off-hooking the CP telephone T4. It is known that the FXO gateway 203 has the characteristic of blocking the electrical signals, and the FXS gateway 211 has the characteristic of regenerating the blocked electrical signals. Therefore, the data transmission ND, the transmission of telephone voice SS and the (reverse/inverse) power (i.e. Pop) supply between the COE 101 and the CPE 103 do not interfere with each other, such that the data transmission ND, the transmission of telephone voice SS and the power supply can be simultaneously implemented in case that only the single twisted-pair cable 105 is established between the COE 101 and the CPE 103.

Certainly, in response to on-hook of the CP telephone T4, the FXS gateway 211 generates an on-hook message of the digital form and transmits the same to the FXO gateway 203 through the xTU-R 207, the power supply device 209, the single twisted-pair cable 105, the power extraction device 205 and the xTU-C 201, and the FXO gateway 203 learns that the CP telephone T4 is on-hook, and accordingly notifies the same to the remote/external telephone connected to the PSTN T2. In this way, the transmission of telephone voice SS between the FXO gateway 203 and the FXS gateway 211 is stopped, and the phone call between the CP telephone T4 and the remote/external telephone connected to the PSTN T2 is cleared.

Moreover, in the aforementioned exemplary embodiment, although the xTU-R 207, the power supply device 209 and the FXS gateway 211 are integrated to construct the CPE 103, the invention is not limited thereto.

To be specific, in the embodiment of the invention, the CPE 103 can be a conventional xDSL device (i.e. the xTU-R 207), and the power supply device 209 and the FXS gateway 211 can be a modularized device to serve as an external module of the xTU-R 207, where the external module can be connected to the conventional xDSL device to construct the whole CPE 103. Apparently, the external module can still be regarded as a part of the CPE 103. In this way, when the network structure 10 of the invention is established/implemented, the existing xDSL device located at the CP side is unnecessary to be replaced or re-purchased, and it is only required externally connect the modularized power supply device 209 and FXS gateway 211 to the xDSL device. Implementation of the CPE 103 is determined according to an actual design/application requirement.

In summary, the network structure 10 of the invention is based on the xDSL and the PSTN, and only the single twisted-pair cable 105 is required to be established between the COE 101 and the CPE 103 thereof to simultaneously implement data transmission ND, transmission of telephone voice SS and (reverse/inverse) power supply (since the FXO gateway 203 is configured to block the electrical signals, and the FXS gateway 211 is configured to regenerate the blocked electrical signals). In this way, the data transmission ND, the transmission of telephone voice SS and the (reverse/inverse) power supply between the COE 101 and the CPE 103 have no interference there between, so as to effectively/totally overcome/resolve the problem mentioned in the related art.

In the invention, only the single twisted-pair cable is configured to implement the data transmission, the transmission of telephone voice and the reverse power supply. In order to avoid a power supply conflict between the forward power supply provided by the COE and the reverse power supply provided by the CPE, the FXO gateway is configured to block the forward power supply provided by the COE for the telephone voice service, and the FXS gateway is configured to regenerate the forward power supply originally provided by the COE for the telephone voice service. The FXO gateway and the FXS gateway transmit the telephone voice and the signals (ringing start, ringing stop, polarity reversal, off-hook, on-hook) there between through a same twisted-pair cable based on signal processing, or covert the telephone voice and the signals into a digital form and transmit the same through the same twisted-pair cable based on a digital transmission method.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

Moreover, any embodiment of or the claims of the invention is unnecessary to implement all advantages or features disclosed by the invention. In addition, the abstract and the name of the invention are only used to assist patent searching and are not used to limit the claims of the invention.

What is claimed is:
1. A network structure, comprising:
a central office equipment; and
a customer premises equipment, connected to the central office equipment through a single twisted-pair cable, and configured to convert an external power and to supply power to the central office equipment through the single twisted-pair cable, wherein data transmission and transmission of telephone voice are performed between the central office equipment and the customer premises equipment through the single twisted-pair cable, wherein the central office equipment blocks a ringing voltage through an analog-to-analog mechanism to generate a digital ringing message and transmits the digital ringing message to the customer premises equipment, and the customer premises equipment regenerates an analog ringing message in response to the digital ringing message.

2. The network structure as claimed in claim 1, wherein the central office equipment comprises:
a central office modem, connected to a network provider through a network cable;
a central office voice gateway, connected to the central office modem, and connected to a public switched telephone network through a central office cable, wherein the central office voice gateway is capable of blocking a plurality of electrical signals from the public switched telephone network; and
a power extraction device, coupled to the central office modem, the central office voice gateway and one terminal of the single twisted-pair cable, and configured to receive and to extract the power supplied by the customer premises equipment through the single twisted-pair cable and to provide the power to the central office modem and the central office voice gateway.

3. The network structure as claimed in claim 2, wherein the customer premises equipment comprises:
a customer premises modem, connected to a customer premises computer through a network cable, and operated by the external power;
a power supply device, coupled to the customer premises modem and another terminal of the single twisted-pair cable, and configured to receive the external power and to convert the received external power for supplying power to the power extraction device of the central office equipment through the single twisted-pair cable; and
a customer premises voice gateway, connected to the customer premises modem, and connected to a customer premises telephone through a telephone line, wherein the customer premises voice gateway is operated by the external power, and is capable of regenerating the electrical signals in response to a ringing signal from the public switched telephone network or off-hook of the customer premises telephone.

4. The network structure as claimed in claim 3, wherein the electrical signals comprise:
a polarity reversal;
a voltage variation of the ringing signal; and
a loop current required for off-hooking the customer premises telephone.

5. The network structure as claimed in claim 3, wherein the power supply device and the customer premises voice gateway are a modularized device to serve as an external module of the customer premises modem.

6. The network structure as claimed in claim 3, wherein the customer premises voice gateway is operated by the external power, and continually supplies power required by the customer premises telephone.

7. The network structure as claimed in claim 3, wherein when the data transmission is performed between the central office equipment and the customer premises equipment, the data transmission is performed between the central office modem and the customer premises modem through the power extraction device, the single twisted-pair cable and the power supply device.

8. The network structure as claimed in claim 7, wherein the transmission of telephone voice is performed between the central office voice gateway and the customer premises voice gateway through the central office modem, the power extraction device, the single twisted-pair cable, the power supply device and the customer premises modem in response to off-hook of the customer premises telephone, or the transmission of telephone voice is stopped in response to on-hook of the customer premises telephone.

9. A central office equipment, connected to a customer premises equipment through a single twisted-pair cable, and the central office equipment comprising:
a central office modem, connected to a network provider through a network cable;
a central office voice gateway, connected to the central office modem, and connected to a public switched telephone network through a central office cable, wherein the central office voice gateway is capable of blocking a plurality of electrical signals from the public switched telephone network; and
a power extraction device, coupled to the central office modem, the central office voice gateway and the single twisted-pair cable, and configured to receive and to extract a power supplied by the customer premises equipment through the single twisted-pair cable and to provide the power to the central office modem and the central office voice gateway,
wherein the central office equipment blocks a ringing voltage through an analog-to-analog mechanism to generate a digital ringing message and transmits the digital ringing message to the customer premises equipment, and the customer premises equipment regenerates an analog ringing message in response to the digital ringing message.

10. The central office equipment as claimed in claim 9, wherein data transmission and transmission of telephone voice are performed between the central office equipment and the customer premises equipment through the single twisted-pair cable.

11. The central office equipment as claimed in claim 9, wherein a customer premises telephone is connected to the customer premises equipment, and the electrical signals comprise:
a polarity reversal;
a voltage variation of a ringing signal from the public switched telephone network; and
a loop current required for off-hooking the customer premises telephone.

12. A customer premises equipment, connected to a central office equipment through a single twisted-pair cable, and the customer premises equipment comprising:
a power supply device, coupled to the single twisted-pair cable, and configured to receive an external power and to convert the external power for supplying power to the central office equipment through the single twisted-pair cable; and
a customer premises voice gateway, connected to a customer premises telephone through a telephone line, wherein the customer premises voice gateway is operated by the external power, and in response to a ringing signal from a public switched telephone network or off-hook of the customer premises telephone, the customer premises voice gateway is capable of regenerating a plurality of electrical signals from the public switched telephone network, wherein the power supply device and the customer premises voice gateway are a modularized device, wherein the central office equipment blocks a ringing voltage through an analog-to-analog mechanism to generate a digital ringing message and transmits the digital ringing message to the customer premises equipment, and a customer premises equipment regenerates an analog ringing message in response to the digital ringing message.

13. The customer premises equipment as claimed in claim 12, further comprising:

a customer premises modem, connected to the power supply device and the customer premises voice gateway, and connected to a customer premises computer through a network cable, and operated by the external power, wherein the modularized device is an external module of the customer premises modem.

14. The customer premises equipment as claimed in claim 12, wherein the electrical signals comprise:

a polarity reversal;

a voltage variation of the ringing signal; and a loop current required for off-hooking the customer premises telephone.

15. The customer premises equipment as claimed in claim 12, wherein the customer premises voice gateway is operated by the external power, and continually supplies power required by the customer premises telephone.

* * * * *